United States Patent Office 2,746,495
Patented May 22, 1956

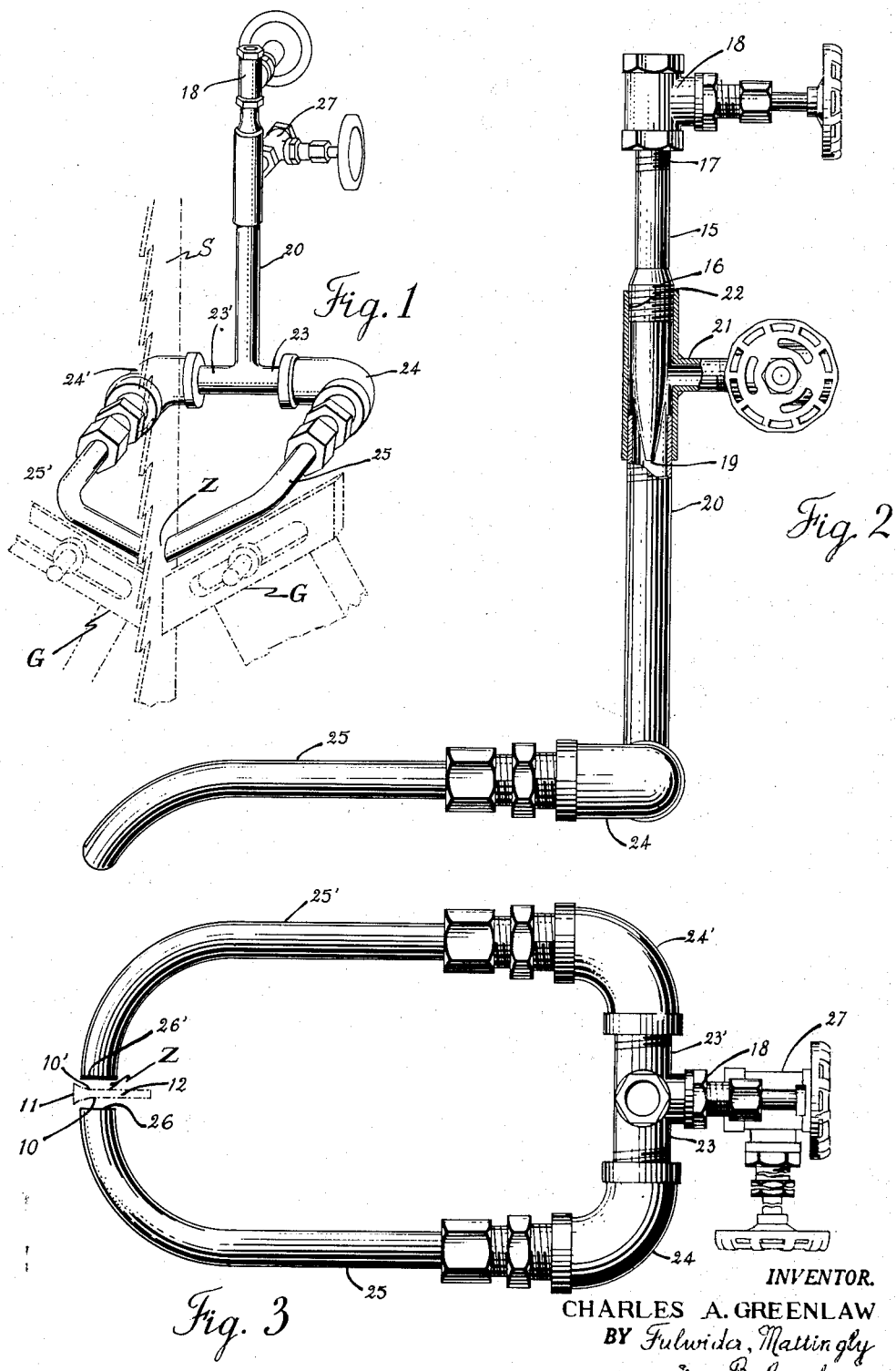

2,746,495

DEVICE AND METHOD FOR PREVENTING HEATING OF A SAW BAND

Charles A. Greenlaw, San Pedro, Calif.

Application February 24, 1953, Serial No. 338,241

1 Claim. (Cl. 143—158)

My invention relates to the field of accessories for sawing devices, and more particularly to an apparatus and method for minimizing the heating of a band saw utilized in cutting pitch-bearing woods.

Although a power driven band saw is an efficient implement for the cutting of wood, it has the disadvantage that it cannot be used in cutting soft, pitch-bearing woods over prolonged periods of time without becoming overheated. The cause of such overheating is due to the fact that the pitch contained in soft woods is deposited on the surfaces of the saw band to the extent that cakes thereof are built up of sufficient thickness that they come into rubbing contact with the material being cut.

This rubbing contact of the pitch deposited on the saw band with the material being cut generates heat which over a period of time transforms the pitch into rigid solidified cakes. This transformation occurs in two stages. In the first stage the volatile oils of the pitch are evaporated and driven off due to the heat generated by the previously described rubbing contact, and in the second stage the deposited pitch assumes an increasingly rigid condition during continued frictional contact with the material being cut. This second stage occurs as the intensity of the heat so generated increases, with the temperature of the pitch being raised until it becomes somewhat carbonized.

The carbonized pitch is at an elevated temperature which tends to cause fresh pitch deposited thereon during the sawing operation to be transformed to a like condition. Heating of the deposited pitch is augmented when the thicknesses of the pitch cakes increase as each newly deposited film or layer of pitch is subjected to the previously mentioned carbonizing action. As the thicknesses of the pitch cakes increase, greater pressure is exerted by them on the material being cut, and with this increased pressure a greater amount of heat is generated by frictional contact.

The saw band on which the pitch is deposited is normally at substantially the same temperature as the pitch cakes between which it is sandwiched. Heat radiates outwardly from the layers of pitch on the band surfaces, and radiates inwardly to the saw band as well. Normally the teeth of the saw band become heated due to frictional contact with the material being cut, and little or none of the heat flowing into the band from the pitch cakes will be dissipated from the saw teeth by radiation. The rearward edge of the saw band and the portions of the sidewalls thereof not covered by pitch are the only surfaces from which the heat transferred to the band from the saw teeth and deposited pitch cakes may escape by radiation. However, the radiating areas of the rearward edge of the saw band and the portions of the sidewalls not covered by pitch are so restricted that they cannot radiate heat at as rapid a rate as it is transferred to the band from the deposited pitch cakes and the saw teeth. Therefore, it will be obvious that a band saw can only be used for cutting soft, pitch-bearing woods for a relatively short time, and must then be removed from the supporting frame in order to remove the solidified pitch therefrom.

Various attempts have been made in the past to eliminate the above described disadvantage inherent in the use of band saws for the cutting of soft, pitch-bearing woods. However, as yet no means has been devised whereby the period of usefulness of a band saw for the cutting of soft woods has been appreciably increased.

The primary purpose in devising my invention is to provide an apparatus and method of using same that minimizes the formation of pitch cake on a band saw and by so doing, prevents overheating of the band.

A primary object of my invention is to provide a device of extremely simple mechanical structure that subjects each portion of a band saw as it completes a revolution, to a localized zone in which a plurality of tiny droplets of a pitch-dissolving material are deposited on the two surfaces of the band.

Another object of my invention is to provide means for depositing said droplets on a saw band at such a rate that pitch coming into contact with said band is prevented from forming a solidified cake thereon, with the non-rigid pitch having so little tenacity that it will be displaced from the saw band due to the centrifugal force of the moving band.

Yet another object of the invention is to supply means by which a band saw may be utilized in the cutting of pitch-bearing wood, with the saw being so maintained that the toothed edge portion and the rear edge portion thereof remain under proper tension whereby the saw will cut true.

A further object of my invention is to suply a device that may be easily mounted on any power driven band saw, does not interfere with the operation of the device, is automatic in operation, and requires little or no maintenance attention.

A still further object of my invention is to furnish a device that may be manufactured from standard commercially available materials, does not require elaborate plant facilities for its production, and may be sold at a sufficiently low price as to encourage its widespread use.

Yet another object of my invention is to provide an apparatus and method that will greatly increase the efficiency of band saws utilized in cutting pitch-bearing woods by lengthening the period of time during which a band saw may be continuously operated without becoming overheated.

These and other objects and advantages of my invention will become apparent from the following description of the apparatus and method thereof, and from the drawing illustrating the apparatus in which:

Figure 1 is a perspective view of my invention installed on a power driven band saw;

Figure 2 is a combined side elevational and vertical cross-sectional view of the device; and, Figure 3 is a plan view of the device.

Referring now to Figure 1 of the drawing for the general arrangement of my invention, it will be seen that it is associated with a conventional band saw S that is maintained in a predetermined cutting position by a guide G. In the past, it has been common practice to place a pad of felt or other absorbent material in rubbing contact with the surfaces of saw S and feed lubricating oil or a liquid pitch-dissolving material thereto. The theory of this operation is that the saturated pad will transfer the liquid material to the sides of the saw S to prevent or minimize the deposit of pitch thereon. However, limited benefit has been derived from pads of this type in minimizing the deposit of pitch on the sides of saw S, inasmuch as the saw-contacting surfaces of the pads wear down after relatively short use, and the liquid with which the pad is saturated is no longer transferred to the saw. In addition, the saw-contacting surfaces of such pads tend to become glazed even before wearing down, which glaze frequently acts as a barrier to prevent the flow of fluid material from the pads to the side walls of the saw.

The inherent disadvantages of saturated pads in the application of liquid material to the side walls of a band saw are eliminated in my invention. In Figures 1 and 3 it will be seen that a localized zone Z is provided in which currents of air carrying a plurality of droplets of a liquid pitch-dissolving material are directed onto the sidewalls 10 and 10' of band saw S. The width of the saw teeth 11 is greater than that of the saw body 12 defined by the sides 10 and 10'. As a result of this construction, the sidewalls 10 and 10' normally do not come into rubbing contact with the material being sawed.

However, when the band saw S is used in cutting soft wood without the use of my invention, it will be found that layers of pitch P are deposited on the sidewalls 10 and 10' directly behind the saw teeth. These deposited layers of pitch P continue to build up in thickness until they are in rubbing contact with the material being cut, with resultant heating of both the pitch layers and the band saw S.

The band saw S is a precise cutting instrument, and is so constructed that the forward teeth-supporting portion thereof and the rearward portion are at all times held in tension. Thus, the tension on the forward portion of the band saw S, as well as the saw guides G (one of which is shown in Figure 1), maintain the teeth 11 in a plane normal to the material being cut. However, when the pitch layers P are deposited on the forwardly disposed portions of the sidewalls 10 and 10', the tooth-supporting edge portion of the band saw is heated and caused to expand. As the tooth-supporting edge portion of the band saw S expands due to such heating, the teeth 11 are no longer held normal to the material being cut, and the saw will wander and tend to follow the grain of the wood rather than cutting cleanly therethrough.

The teeth 11 of the saw S are heated by frictional contact during a sawing operation, but this heat is distributed through the saw body 12 due to the high conductivity of the steel from which it is fabricated. The external area provided by the side walls 10 and 10' is sufficient to permit radiation of the heat generated by the above-mentioned sawing operation to be dissipated therefrom, with this radiation taking place at a sufficiently rapid rate to prevent the rise in temperature of the saw body 12 above a predetermined point. Pitch is not a good heat conductor, and when deposited on the side walls 10 and 10', immediately reduces the surface radiation efficiency thereof. As the radiation efficiency of the side walls 10 and 10' diminishes, the temperature of the saw body 12 rises. Thus, the deposit of pitch on the side walls 10 and 10' is correspondingly detrimental to the operation of the saw S, even before the pitch layers are of sufficient thickness to come into rubbing contact with the material being cut.

The structure of my invention that prevents the formation of pitch layers on the band saw S is extremely simple. An elongated tubular nozzle 15 is provided having external intermediately disposed threads 16 formed thereon. Nozzle 15 has threads 17 formed on the upwardly disposed end thereof, which threads engage a conventional valve 18. Valve 18 is connected by tubing or pipe to a source of liquid pitch-dissolving material (not shown). The pitch-dissolving material may be lubricating oil, or any one of numerous liquid hydrocarbons or mixtures thereof suitable for this purpose. The downwardly disposed end portion of nozzle 15 is swaged inwardly, terminating in an aperture 19 through which the liquid pitch-dissolving material is discharged.

A first elongated tubular member 20 is provided that has a side inlet 21, and threads 22 are formed in the upper end portion thereof. Nozzle 15 is so positioned as to extend downwardly into tubular member 20, with the threads 16 and 22 in engagement. The nozzle 15, as may best be seen in Figure 2, is of such length that the aperture 19 is disposed below the level of side inlet 21. The lower end of tubular member 20 terminates in two oppositely disposed branches 23 and 23', which branches have tubular ninety-degree elbows 24 and 24' respectively mounted on the outwardly disposed ends thereof. A second tubular member 25 and a third tubular member 25', identical in shape, extend outwardly from the forwardly disposed ends of elbows 24 and 24' respectively. The end portions of tubular members 25 and 25' curve inwardly toward one another and terminate in apertures 26 and 26', which apertures are laterally separated to form zone Z through which the saw band S passes. A valve 27 is threaded or otherwise affixed to the outwardly disposed end of side inlet 21, and the valve is connected to a source of compressed air (not shown).

My invention as above described may be mounted on a power driven band saw as shown in Figure 1, and as the particular mounting means therefor forms no part of the invention, it is neither shown nor described herein.

After installation as shown in Figure 1, and ready for operation, valve 27 is opened sufficiently to permit currents of air of the desired velocity to be discharged from apertures 26 and 26' onto the side walls 10 and 10' of the band saw S. Valve 18 is then opened to the extent that liquid pitch-dissolving material may be discharged from aperture 19 at the desired rate. Liquid discharged from aperture 19 is atomized within the confines of the first tubular member 20 due to the action of the current of air flowing outwardly from side inlet 21. Tiny droplets resulting from the atomizing action are carried downwardly within the first tubular member 20 by said air current to enter the second and third tubular members and thence discharged through apertures 26 and 26' into zone Z and thus remove pitch P deposited on side walls 10 and 10'.

The invention is preferably placed in operation before the saw S is utilized to cut wood whereby the droplets of pitch-dissolving material is deposited on the side walls 10 and 10' to form a substantially continuous film thereon when the saw band rotates. It will be apparent that the film so formed may only build up to a certain maximum, for when it tends to increase above this maximum value, a portion of the film will be displaced due to the centrifugal force generated by the rotation of the saw band.

Pitch deposited on the band saw is immediately dissolved in the film of pitch-dissolving material. The viscosity of the mixture of pitch and pitch-dissolving material on the band saw may vary between that of a liquid to a paste form. The variance in viscosity of the mixture depends upon the quantity of droplets deposited on the saw surfaces as well as the pitch content of the wood being worked. However, irrespective of the viscosity of the mixture, it can only build up to a predetermined maximum value in direct ratio to the rotational speed of the band saw, for when this value is exceeded, the mixture of pitch and pitch-dissolving material is displaced due to the centrifugal force of the saw.

It will be noted that the adjustment of valves 18 and 26 is of utmost importance, for the viscosity and tenacity of the deposited pitch and pitch dissolving material mixture must be such that portions thereof may be displaced from the saw band before it is of sufficient thickness to contact the material being cut.

Although the apparatus and method above described are fully capable of providing the objects and advantages hereinbefore mentioned, I wish it clearly understood that they are merely the present embodiment of my invention, and that I do not mean to be limited to the details described and illustrated herein other than as defined by the appended claim.

I claim:

A method of maintaining a band saw used in cutting pitch-bearing wood in a true sawing condition, by causing said saw prior to engaging said wood to pass between two downwardly and inwardly directed air currents that may be adjusted to the desired velocity, discharging a pitch-dissolving liquid material into said air currents at such a rate to atomize said liquid into sufficiently fine particles that they adhere to said band surface until the pitch deposited thereon is dissolved to a non-solid state and is displaced from said band due to the motion thereof, and so controlling the quantities of said discharged air and atomized liquid as to provide a stationary cooling zone wherein the heat generated by the frictional engagement of said teeth with said wood is partially removed and the toothed edge of said saw and the rear edge of said saw are at substantially the same temperature and under proper tension relative to each other.

References Cited in the file of this patent

UNITED STATES PATENTS

| | | |
|---|---|---|
| 458,523 | Elliott | Aug. 25, 1891 |
| 602,943 | Hinkley | Apr. 26, 1898 |
| 755,027 | Mathews | Mar. 22, 1904 |
| 1,812,942 | Gaines | July 7, 1931 |
| 2,417,403 | Zonis | Mar. 11, 1947 |
| 2,685,311 | Ferrari | Aug. 3, 1954 |